United States Patent [19]

Matsubara et al.

[11] Patent Number: 4,535,927

[45] Date of Patent: Aug. 20, 1985

[54] WORKPIECE PRESET JIG ARRANGEMENT IN A WELDING APPARATUS

[75] Inventors: Soichi Matsubara, Oura; Hirobumi Morita, Shiki; Shinpei Watanabe, Hidaka, all of Japan

[73] Assignee: Honda Giken Kogyo Kabushiki Kaisha, Tokyo, Japan

[21] Appl. No.: 500,826

[22] Filed: Jun. 3, 1983

[30] Foreign Application Priority Data

| Jun. 4, 1982 | [JP] | Japan | 57-94784 |
| Jun. 5, 1982 | [JP] | Japan | 57-96801 |
| Jun. 7, 1982 | [JP] | Japan | 57-96315 |
| Jun. 7, 1982 | [JP] | Japan | 57-93423[U] |

[51] Int. Cl.³ .................................................. B23K 9/32
[52] U.S. Cl. ...................................... 228/6.1; 278/47; 219/80
[58] Field of Search .................... 228/4.1, 6 R, 47; 219/79, 80

[56] References Cited

U.S. PATENT DOCUMENTS

| 3,288,978 | 11/1966 | Trygar | 219/80 |
| 3,872,815 | 3/1975 | Kawai et al. | 228/47 X |
| 4,160,147 | 7/1979 | Matsubara et al. | 219/80 X |
| 4,392,601 | 7/1983 | Fujikawa et al. | 228/4.1 |
| 4,404,451 | 9/1983 | Nijkawa et al. | 219/80 |
| 4,441,645 | 4/1984 | Takagishi et al. | 219/80 X |
| 4,442,335 | 4/1984 | Rossi | 219/80 X |

FOREIGN PATENT DOCUMENTS 177886  9/1981  Japan ........................ 219/80

Primary Examiner—Kenneth J. Ramsey
Attorney, Agent, or Firm—Armstrong, Nikaido, Marmelstein & Kubovcik

[57] ABSTRACT

A workpiece preset jig arrangement for a welding apparatus. The welding apparatus has an apparatus body, a welding jig mechanism on the body and clamps on the welding jig mechanism for clamping plural component parts for constituting a workpiece so that the workpiece may be welded to another workpiece by the welding jig mechanism. The preset arrangement includes a preset arrangement body positioned adjacent the welding apparatus body, a preset jig mechanism provided on the arrangement body, and preset clamps mounted on the preset jig mechanism for clamping the plural component parts. The preset jig mechanism is moveable between a set position facing the welding jig mechanism and a preset position away from the set position and the welding jig mechanism. The set position is such that the plural component parts may be transferred from the preset jig mechanism to the welding jig mechanism simply by releasing the clamps on the preset jig mechanism and engaging the clamps on the welding jig mechanism. The present jig mechanism provides an apparatus for preassembling the plural component parts while the welding jig mechanism is engaged in welding previously preassembled component parts.

15 Claims, 16 Drawing Figures

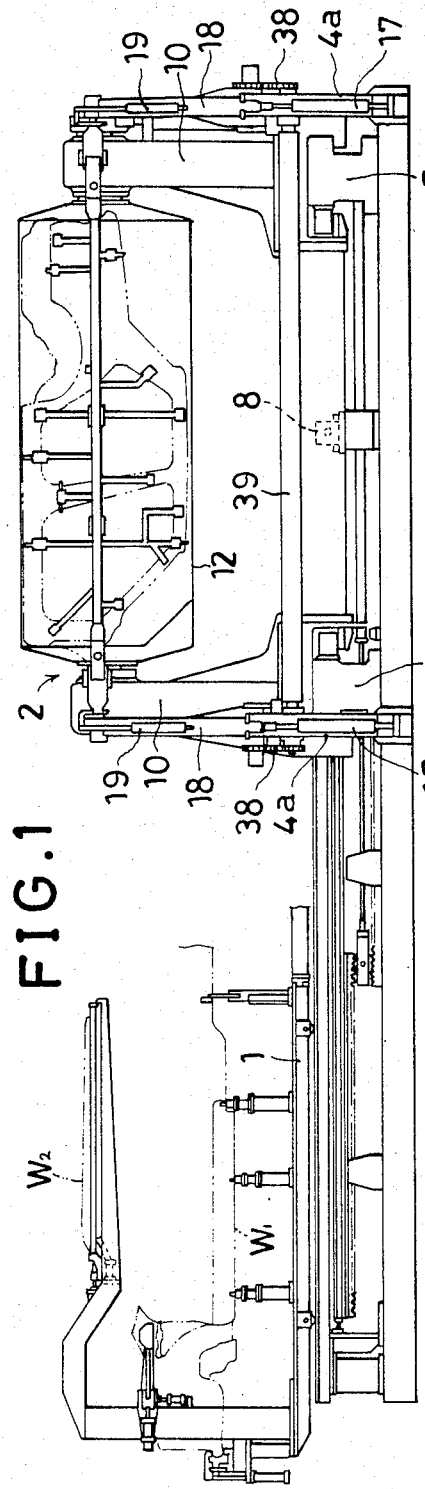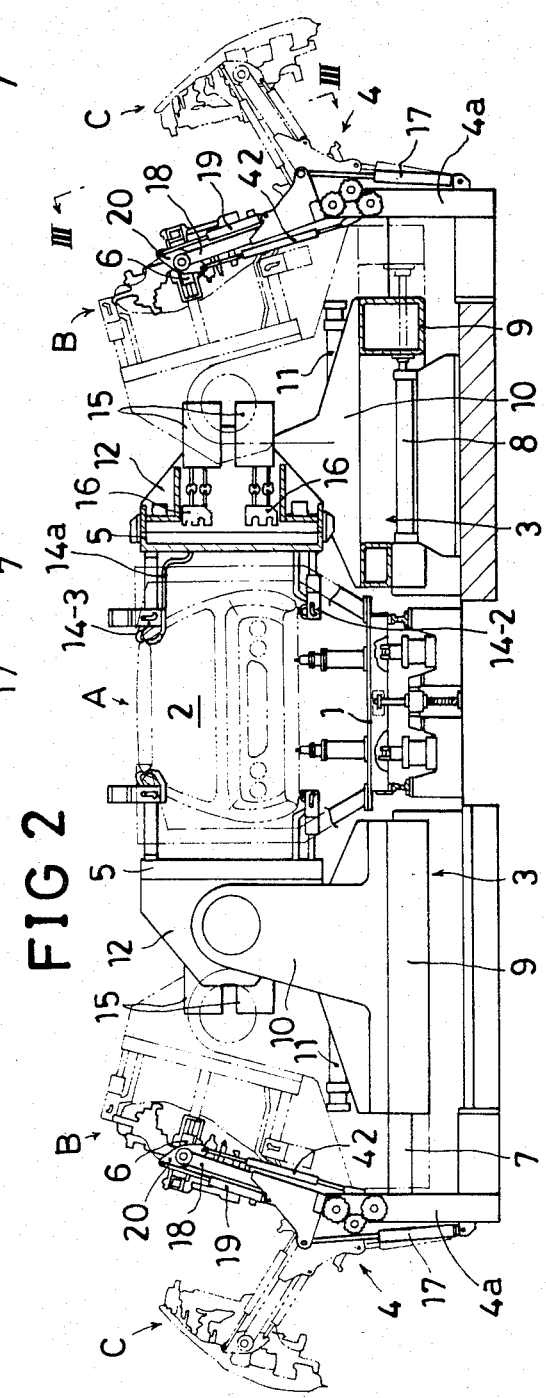

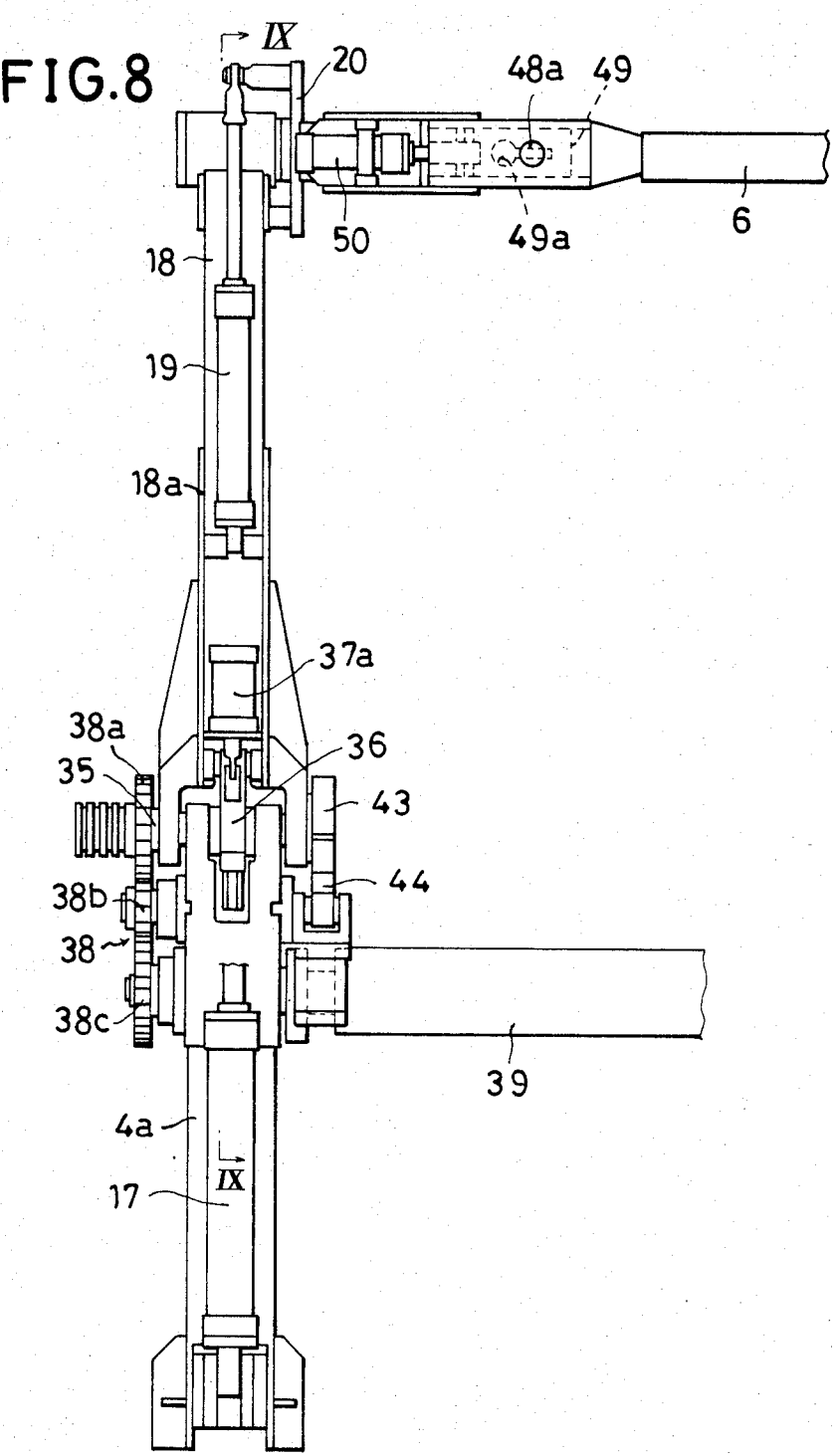

WORKPIECE PRESET JIG ARRANGEMENT IN A WELDING APPARATUS

BACKGROUND OF THE INVENTION

This invention relates to an arrangement for presetting of a workpiece in a welding apparatus for a motorcar body or the like.

An apparatus for assembling and welding a side panel on each side of a motorcar body in relation to a floor panel and a roof panel thereof has hitherto been proposed by the applicants of this application. In this apparatus a welding jig means provided on a welding apparatus body is provided with a clamp means for clamping plural outer and inner component parts for constituting a side panel so that these component parts may be set in overlapped condition and welded together on the welding jig means to form the side panel. The resultant side panel may be then connected by welding to the floor panel and the roof panel through the welding jig means. (U.S. patent application Ser. No. 268,572 filed May 29, 1981, now U.S. Pat. No. 4,404,451). This has the inconvenience, however, that it is troublesome to set the component parts for constituting the side panel in overlapped condition on the welding jig means. The loss of time required for such a setting work becomes a hindrance to improvement in working efficiency. In order to complete the assembling, by clamping of the side panel with the floor panel and the roof panel, it is necessary to set the component parts in such an overlapped condition on the welding jig means that an outer part thereof may be disposed on the inner side and each of inner parts thereof may be disposed on the outer side (that is, outside the set inner panel). Accordingly, the respective inner parts, at the time of setting thereof, have to be clamped one by one so as to be fixedly overlapped with the outer parts already set and clamped. Such required setting work results in lowering of the working efficiency.

SUMMARY AND OBJECTS OF THE INVENTION

It is an object of the present invention to provide a workpiece preset jig arrangement for a welding apparatus which increases the efficiency of operation of the welding apparatus.

It is a further object of the present invention to provide a preset jig arrangement such that plural component parts for constituting a workpiece can be set on a welding jig means of a welding apparatus already assembled in their respective desired positions.

It is yet a further object to provide a preset jig arrangement for a welding apparatus wherein a workpiece comprising inner parts and outer parts can be set so that the inner parts thereof can be positioned inside and the outer parts thereof positioned outside in a ready and simple manner onto a welding jig means of a welding apparatus.

It is a still further object of the present invention to provide an arrangement whereby plural component parts to be assembled into a workpiece can be pre-assembled and readied for transfer to a welding jig means of a welding machine while that welding jig means is involved in the process of welding previously pre-assembled parts together.

The above and other objects are obtained in a workpiece preset jig arrangement in a welding apparatus wherein the welding apparatus has a welding apparatus body, welding jig means on the body, and clamp means on the welding jig means for clamping plural component parts constituting a workpiece so that the workpiece may be welded to another workpiece by the welding jig means. The arrangement comprises a preset arrangement body positioned adjacent the welding apparatus body, a preset jig means provided on the preset arrangement body, and preset clamp means on the preset jig means for clamping the plural component parts. The preset jig means is moveable between a set position facing the welding jig means and a preset position away from the set position and the welding jig means. The set position is such that plural component parts may be transferred from the preset jig means to the welding jig means simply by releasing the clamp means on the preset jig means and engaging the clamp means on the welding jig means.

The preset arrangement can further comprise a docking mechanism for mutually positioning and combining the welding jig means and the preset jig means at the set position.

The arrangement can further comprise means for detachably connecting the welding jig means and the preset jig means to the welding apparatus body and the preset arrangement body, respectively, so that the two jig means may be released from engagement thereof with the respective bodies while the two jig means are connected together by the docking mechanism.

The preset arrangement body can be provided with a pair of swingable arms each being so supported through a supporting shaft on a machine frame so as to be swingable between the set position and the preset position. The preset jig means can be connected to the two swingable arms through a pair of brackets each supported turnably in either direction on one of the swingable arms. In this manner, the preset jig means may be moved between the set position and the preset position while being turned over between an inwardly facing posture and an outwardly facing posture by the swing movements of the respective swingable arms and the turnover movements of the respective brackets.

Each supporting shaft for each swingable arm can be turnable about both the swingable arm and the machine frame. A turnover index can be arranged to be turned in conjunction with the turnover movement of each bracket. The turnover index is fixedly provided on each supporting shaft. Each turnover index can be provided with a turnover lock which can be engaged with and disengaged from the same. The machine frame can be provided with a single common synchronous shaft connected to each supporting shaft through a power transmission mechanism associated with each shaft.

A receiving member can be provided on each bracket for detachably attaching the preset jig means. The receiving member can be moveable to advance and retreat along the direction of swing movements of each swingable arm. The preset jig means can be detachably engaged with each receiving member through an engaging pin which is long in the direction of advancing and retreating movements of the receiving member.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is a side view of one example of this invention applied to a welding apparatus for a motorcar body;

FIG. 2 is a sectional front view thereof;

FIG. 8 is a side view of a swingable arm section thereof;

DETAILED DESCRIPTION OF A PREFERRED EMBODIMENT

Figure 15:
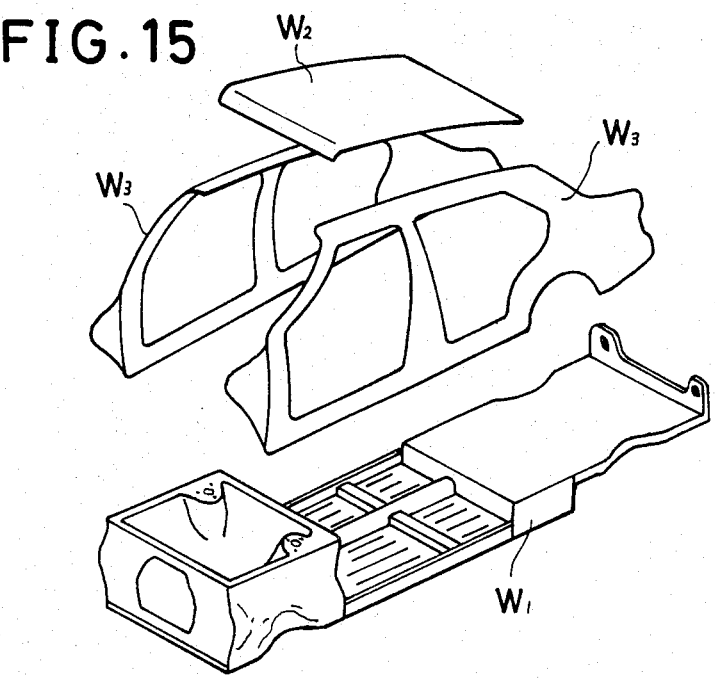
FIG. 15 is an exploded perspective view of a motorcar body.

One embodying example of this invention will be explained with reference to the accompanying drawings:

The illustrated example is one in which this invention is applied to the foregoing previously proposed welding apparatus for a motorcar body wherein a floor panel $W_1$, a roof panel $W_2$ and a side panel $W_3$ on each side of a motorcar body as shown in FIG. 15 are assembled and welded together.

A welding station 2 is arranged to have introduced thereto the floor panel $W_1$ and the roof panel $W_2$ set on and carried by a carrier 1. Each side of the welding station is provided with a welding apparatus body 3 and a preset arrangement body 4 located outside the welding apparatus body 3. A welding jig means 5 and a preset jig means 6 are supported on the welding apparatus body 3 and the peset arrangement body 4, respectively.

The welding apparatus body 3 comprises a moveable base 9 arranged to advance and retreat by an operation cylinder 8 along a guide bar 7, a pair of supporting posts 10, 10 built on the moveable base 9, and a frame base 12 supported between the two supporting posts 10, 10 and arranged to be turned over by a turnover cylinder 11. The welding jig means 5 is attached to the front surface of the frame base 12 so that the welding jig means 5 may be reciprocated between its inner welding position A facing and its outer set position B, while being turned over between its inwardly facing posture facing the welding station 2 and its outwardly facing posture, by advancing and retreating movements of the moveable base 9 and turnover movements of the frame base 12.

Figure 3:
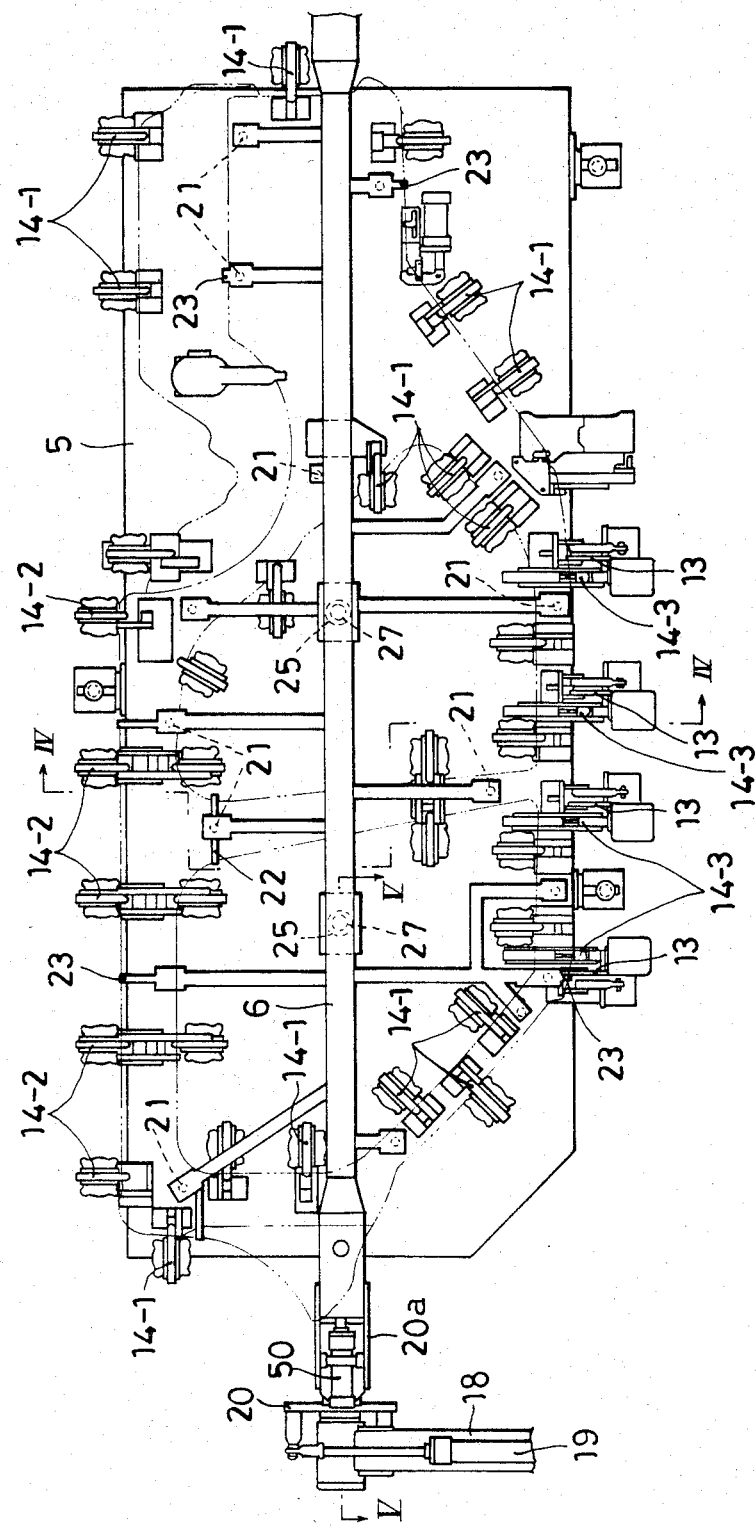
FIG. 3 is a side view of a docking condition of a welding jig means and a preset jig means as viewed from the line III—III in FIG. 2.
Figure 4:
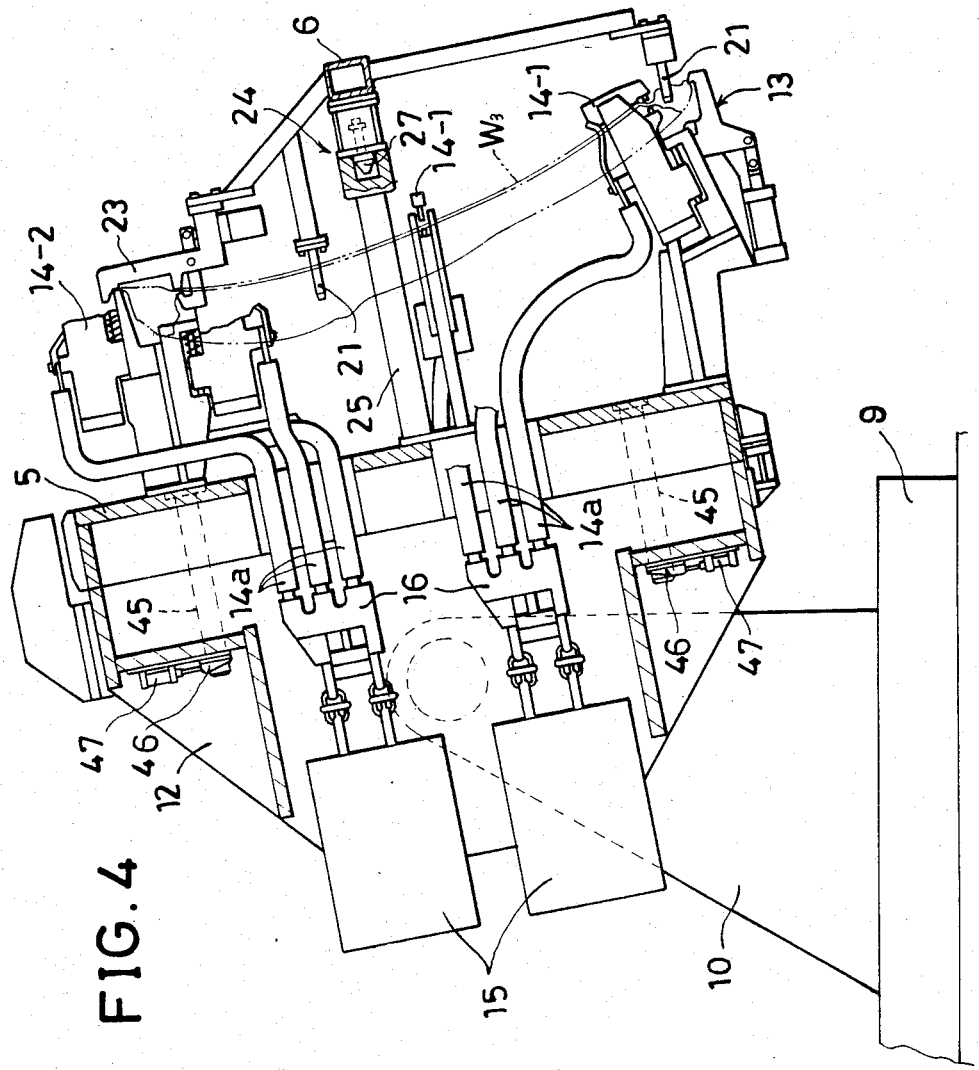
FIGS. 4 and 5 are sectional views taken along the lines IV—IV and V—V, respectively in FIG. 3.
Figure 16:
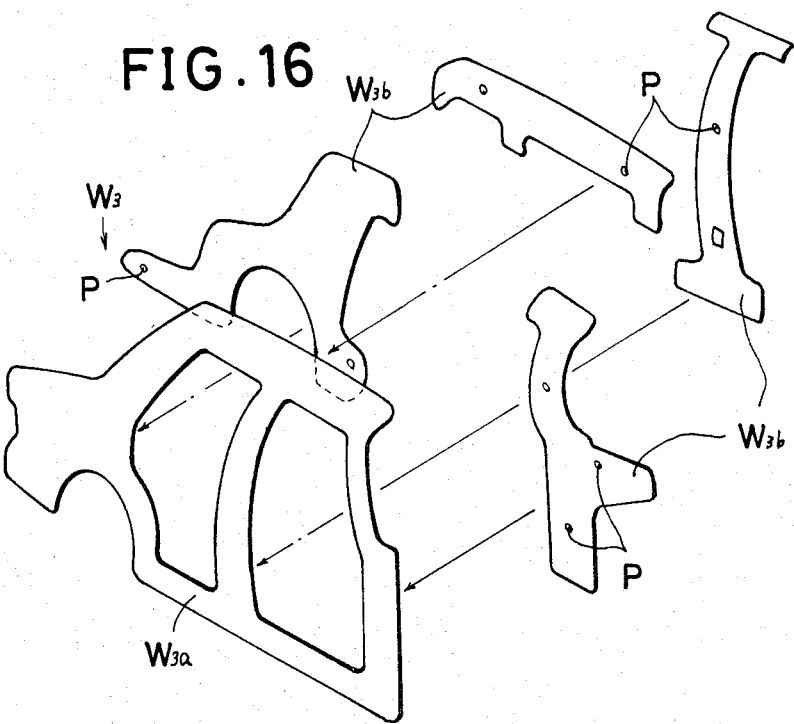
FIG. 16 is an exploded perspective view of a side panel thereof.

Referring to FIGS. 3, 4 and 16 the welding jig means 5 is provided with clamp members 13 for clamping an outer part $W_{3a}$ and plural inner parts $W_{3b}$; that is, plural component parts constituting a workpiece for a side panel $W_3$, as shown in FIG. 16; first welding members 14-1 for welding together those component parts under the clamped condition thereof so as to form the side panel $W_3$; second welding members 14-2 for welding the side panel $W_3$ to the floor panel $W_1$; third welding members 14-3 for welding the side panel $W_3$ to the roof panel $W_2$; and cables 14a connecting welding members 14-1, 14-2, 14-3 through connectors 16 to transformers 15 mounted on the frame base 12.

The foregoing constructions are not essentially different from those in the foregoing previously proposed one.

The foregoing preset arrangement body 4 has a pair of swingable arms 18, 18, each being pivotally supported on each machine base 4a and arranged to be swingably moved by each swingable cylinder 17. Each of the swingable arms 18, 18 is provided at its top end portion with a turnable bracket 20 pivotally supported thereon and arranged to be operated by a turnover cylinder 19. The foregoing preset jig means 6 is provided between the two swingable arms 18, 18 through the respective brackets 20 so that the present jig means 6 may be reciprocated between the foregoing set position B and a preset position C thereof located outside the set position B, while being turned over between its inwardly facing posture and its outwardly facing posture, by the turnover movements of each bracket 20 and the swing movements of each swingable arm 18.

As shown in FIGS. 3 and 4, the preset jig means 6 is provided with plural positioning pins 21 each fittably insertable into a corresponding positioning opening P made in each of the inner parts $W_{3b}$ for the side panel $W_3$, plural positioning members 22 for positioning the inner parts $W_{3b}$ and the outer parts $W_{3a}$, and plural clamp members 23 for clamping those parts $W_{3b}$ and $W_{3a}$. After each inner part $W_{3b}$ is attached to the preset jig means 6 while being set in position by each pin 21, the outer parts $W_{3a}$ may be placed on the inner parts $W_{3b}$ while being set in position by the positioning members 22, and thereafter those parts are clamped together by the clamp members 23.

Figure 12:
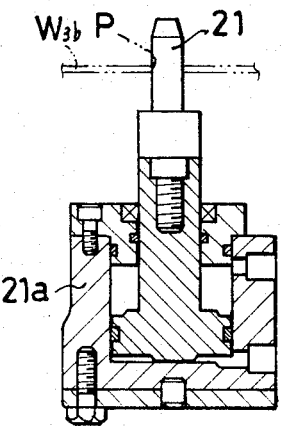
FIG. 12 is a sectional view of a positioning pin on the preset jig means.
Figure 13:
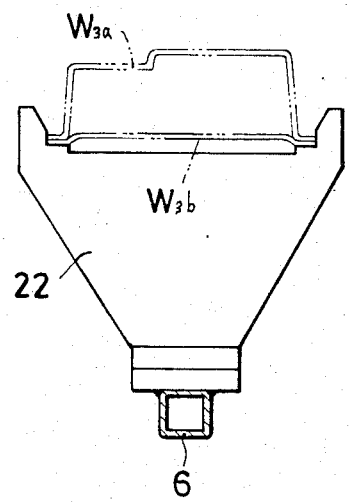
FIG. 13 is a top plan view of a positioning member on the preset jig means.
Figure 14:
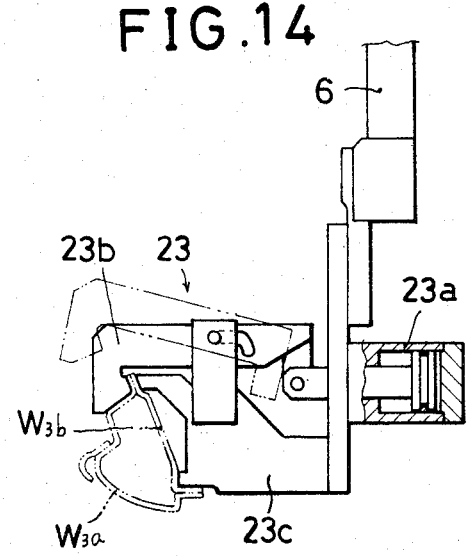
FIG. 14 is a side view of a clamp member on the preset jig means.

The details of the positioning pins 21, the positioning members 22 and the clamp member 23 are as shown in FIGS. 12 to 14. Namely, each positioning pin 21 is arranged to be operated to advance and retreat by a cylinder 21a. Each positioning member 22 comprises a nearly U-shaped plate member into which the inner parts $W_{3b}$ and the outer parts $W_{3a}$ can be fittably mounted. Each clamp member 23 is provided with a clamp arm 23b arranged to be moved to open and close in relation to a receiving member 23c by a cylinder 23a so that the inner parts $W_{3b}$ and the outer parts $W_{3a}$ may be clamped together under their overlapped condition between the clamp arm 23b and the receiving portion 23c facing the same.

A docking mechanism 24 is provided for mutually positioning and holding the welding jig means 5 and the preset jig means 6 at the set position B. The docking mechanism 24 comprises, as shown clearly in FIG. 5, a docking pole 25 projecting from the welding jig means 5, a receiving frame 28 provided on the preset jig means 6 and having a tapered positioning pin 27 adapted to be mounted in a cavity 26 made in the forward end of the docking pole 25 and a clamp member 29 provided on the receiving frame 28. The clamp member 29 is composed of a clamp arm 31 connected to a cylinder 30 and a push member 33 urged by a spring 32 and serving to push the clamp arm 31 in an ordinary condition towards its closing side (counterclockwise direction in FIG. 5)

so that the docking between the two jig means 5, 6 may be carried out. That is, the pin 27 mounts in the cavity 26 under the condition that the clamp arm 31 is pushed backwards to be open by operation of the cylinder 30 against the action of the push member 33. Then, the pushing operation of the cylinder 30 is removed and the clamp arm 31 is closed by operation of the push member 33 for clamping the pole 25 onto the receiving frame 28.

The positioning operation of the preset jig means 6 may be carried out in such a manner that when the same is moved to its inner set position B by the swing movements of the pair of the swingable arms 18, 18 of the present arrangement body 4, the same, as it is intact, is docked with the welding jig means 5. However, since the preset jig means 6 is given a circular motion, the positioning thereof in relation to the welding jig means 5 is lacking in reliability. In this respect, in the illustrated example, as shown clearly in FIG. 5, a receiving member 20a provided on the bracket 20 on each side for attaching the preset jig means 6 is constructed to be moveable to advance and retreat by each shift cylinder 34 along the directions of swing movements of the swingable arm 18 so that afer each swingable arm 18 is swung to reach a predetermined position thereof, the receiving member 20a is advanced inwards by the shift cylinder 34. Consequently, the preset jig means 6 can be given, after given the circular motion thereof, a linear motion in the tangential direction thereof, whereby the positioning thereof can be effected smoothly and reliably.

Next, the operation of the foregoing example will be explained as follows:

Firstly, the inner parts $W_{3b}$ for the side panel $W_3$ and the outer parts $W_{3a}$ thereof are set in such a manner as above described on therefore the preset jig means 6 in the outwardly facing posture at the preset position C. Those parts are clamped together on the jig means 6 by the clamp members 23. Thereafter, the jig means 6 is turned over to its inwardly facing posture by the turnover operations of the brackets 20 and is moved to the inward set position B by the swing movements of the swingable arms 18. The preset jig means 6 is docked by the docking mechanism 24 with the welding jig means 5 waiting at the set position B in its outwardly facing posture. Thereafter, the inner parts $W_{3b}$ and the outer parts $W_{3a}$ are transferred in their predetermined set condition to the welding jig means 5 in therefore such a way that the clamp members 13 on the welding jig means 5 are operated and the clamp members 23 on the preset jig means 6 are released from operation. Thus, the inner parts $W_{3b}$ and the outer parts $W_{3a}$ are clamped on the welding jig means 5 under an overlapped condition wherein the outer parts $W_{3a}$ are therefore positioned at the inner side and the inner parts $W_{3b}$ are positioned on the outer side. Then those parts are welded together by the first welding members 14-1 on the jig means 5 at the set position B so as to form the side panel $W_3$.

Next, the welding jig means 5 is turned over to its inwardly facing posture and is moved to the inside welding position A. The side panel $W_3$, that is the workpiece, is assembled from outside with other workpieces, that is, the floor panel $W_1$ and the roof panel $W_2$ on the welding station 2, and then these work pieces are welded together by the second and third welding members 14-2, 14-3 on the jig means 5.

During this welding operation, the preset jig means 6 is turned back to the preset position C, and the inner parts $W_{3b}$ and the outer parts $W_{3a}$ for the next side panel $W_3$ are set thereon as described above. The preset jig means 6 is turned over and moved to the set position B by the time when the welding jig means 5 is turned back to the set position B after the completion of the welding operation, and the foregoing subsequent operations are repeated.

In the above case, for assembling the side panel $W_3$ with the floor panel $W_1$ and the roof panel $W_2$ at the welding station 2 under the condition that the inner parts $W_{3b}$ thereof are positioned on the inner side, it is necessary that the outer parts $W_{3a}$ are set on the inner side and the inner parts $W_{3b}$ are set on the outer side to the welding jig means 5 at the set position B. Therefore, if such a setting is intended to be effected through the preset jig means 6 according to the present invention, those parts are so set on the jig means 6 that, in reverse relation thereto, the inner parts $W_{3b}$ may be disposed on the inner side and the outer parts $W_{3a}$ may be disposed on the outer side, that is, outside the inner parts $W_{3b}$. Thus, it becomes possible that the inner parts $W_{3b}$ are provided with the positioning holes P as mentioned above and are mounted and supported at their holes P on the positioning pins 21 on the jig means 6, so that it becomes unnecessary to clamp the inner parts $W_{3b}$ individually by clamp members or the like, and as a result, the workability can be improved.

Furthermore, in a case where the outer parts $W_{3a}$ cannot be provided with any hole for insertion of the positioning pins or the like in view of an appearance of the side panel to be produced, and the outer parts $W_{3a}$ are set on the inner side and the inner parts $W_{3b}$ are set outside the outer parts $W_{3a}$, it cannot be avoided that the inner parts $W_{3b}$ are clamped individually by the clamp members extending inwards beyond the outer edge of the outer parts $W_{3a}$.

If, when it is intended to move or turn over the preset jig means 6, the pair of swingable arms 18, 18 do not swing synchronously and the two brackets 20, 20 are not turned over synchronously, the preset jig means 6 is subjected to an unnatural force such as a twisting force or the like. In this respect, in the illustrated example, there is provided such a construction as described below so that both the swing movements of the two swingable arms 18, 18 and the turnover movements of the two brackets 20, 20 may be synchronized by a single common synchronous shaft 39.

Figure 9:
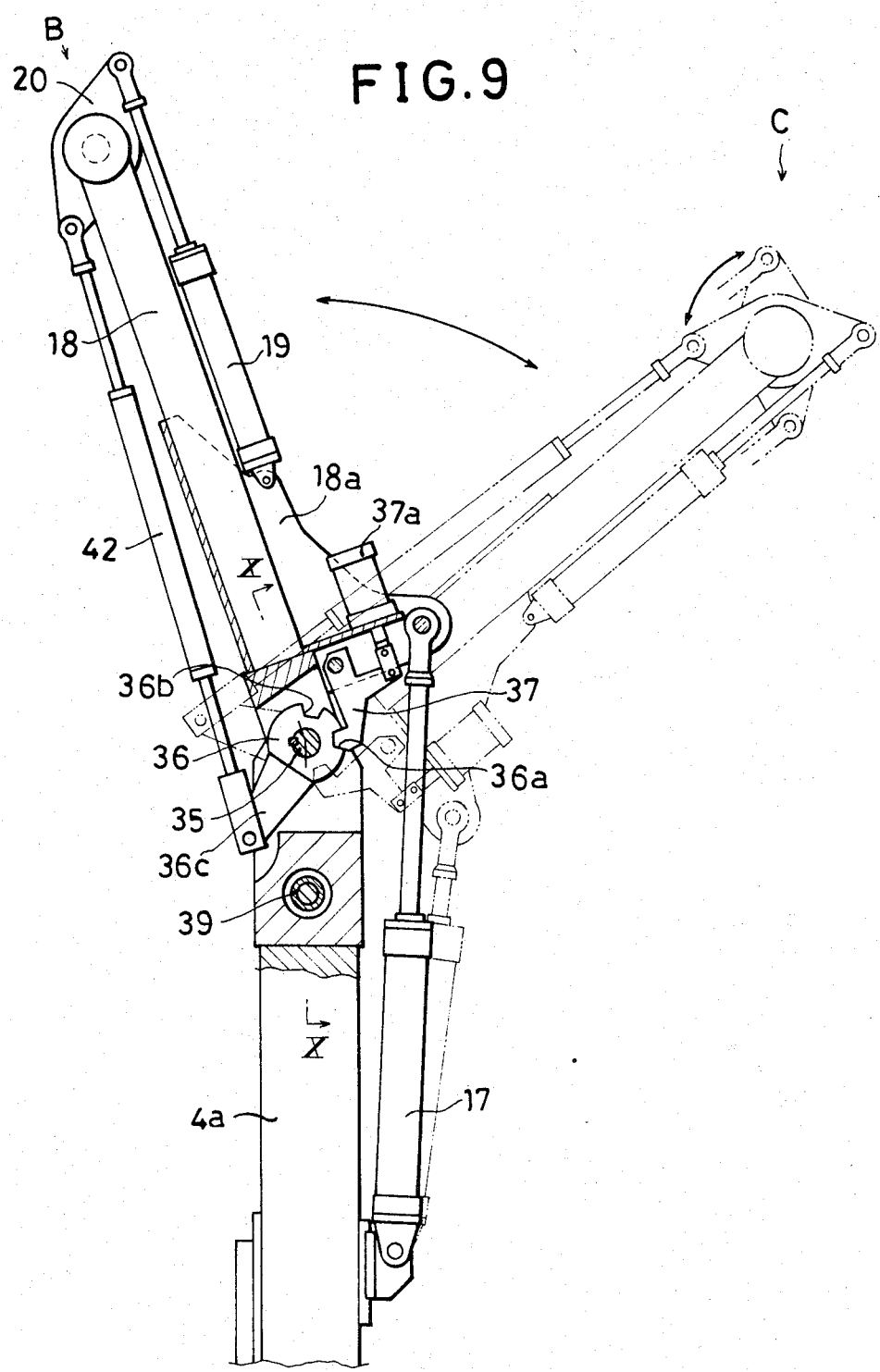
FIG. 9 is a sectional view taken along the line IX—IX in FIG. 8.

Namely, as seen in FIGS. 8 and 9, each supporting shaft 35 for supporting each swingable arm 18 on the machine frame 4a on each side is arranged to be turnable in relation to both the swingable arm 18 and the machine frame 4a. A turnover index 36 arranged to be turned in conjunction with the turnover movements of each bracket 20 is fixedly provided on each supporting shaft 35. Each swingable arm 18 is provided with a turnover lock 37 which can be engaged with and disengaged from the turnover index 36. The single common synchronous shaft 39 connected to each supporting shaft 35 through each transmission mechanism 38 is pivotally supported on the machine frame 4a.

Figure 10:
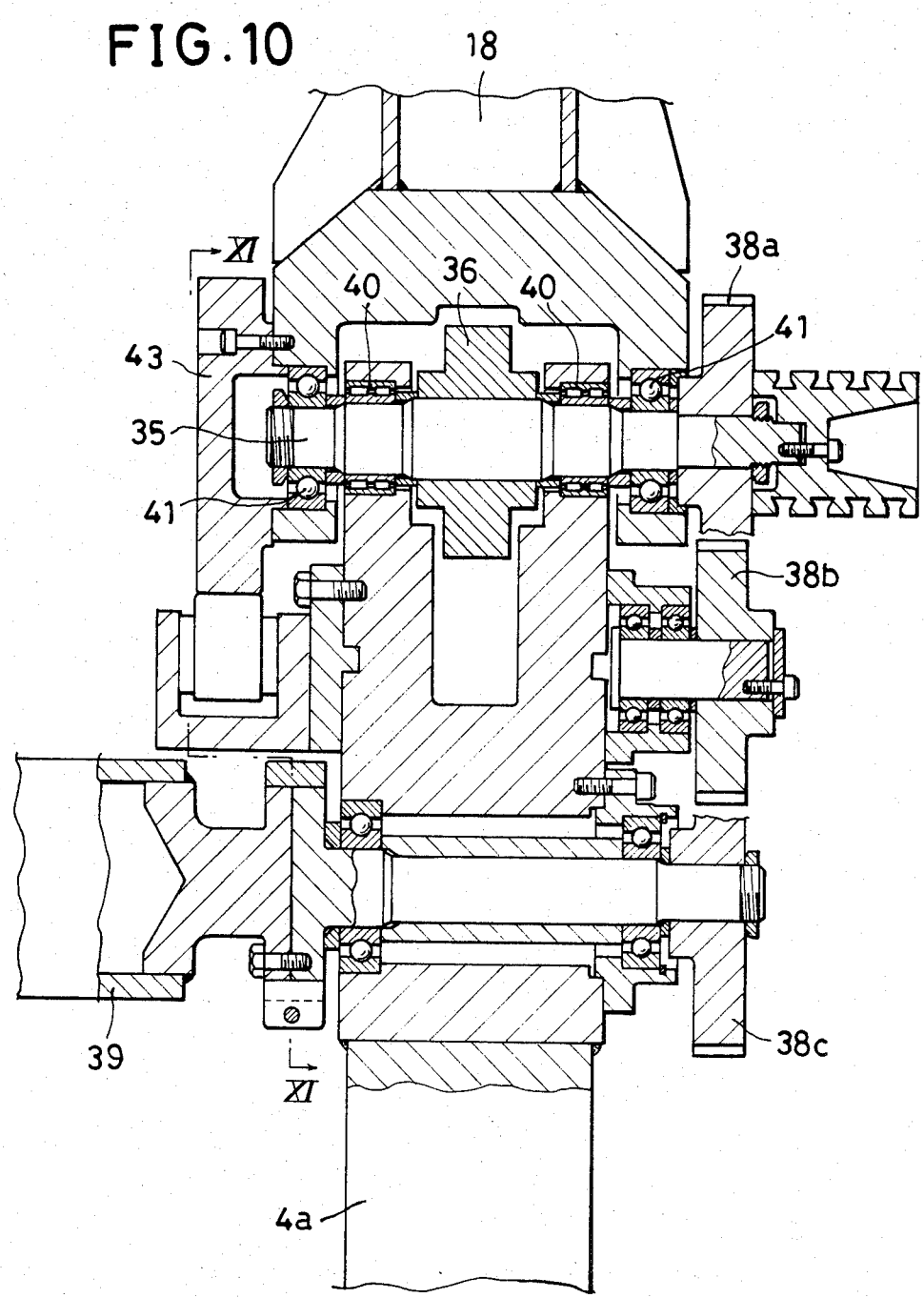
FIG. 10 is an enlarged sectional view taken along the line X—X in FIG. 9.

This will be explained more in detail as follows: As shown clearly in FIG. 10, each supporting shaft 35 is supported through a pair of bearings 40 on the machine frame 4a. Each swingable arm 18 is supported thereon through a pair of bearings 41, 41. As shown clearly in FIG. 9, the turnover index 36 fixed to the supporting shaft 35 is connected, at its projecting member 36c projecting integrally therefrom, to the bracket 20 through a link 42 so that the index 36 may be given turning movements made in conjunction with the turnover movements of each bracket 20.

The turnover index 36 has a pair of index grooves 36a, 36b corresponding respectively to the inwardly facing turnover position and the outwardly facing turnover position of each bracket 20. The turnover lock 37 is pivotally supported on a supporting frame 18a fixedly provided on each swingable arm 18. The turnover lock 37 is arranged to be inserted in and engaged with either of the index grooves 36a, 36b by a lock cylinder 37a connected thereto. Thus, each bracket 20 may be locked at each turnover position through the turnover index 36. The single common synchronous shaft 39 is pivotally supported on both the machine frames 4a and is located below each supporting shaft 35 and in parallel therewith. Each supporting shaft 35 is connected to the synchronous shaft 39 through a transmission mechanism 38 of gear type comprising a gear 38a fixed to the supporting shaft 35, an intermediate idle gear 38b and a gear 38c fixed to the corresponding end portion of the synchronous shaft 39.

Figure 11:
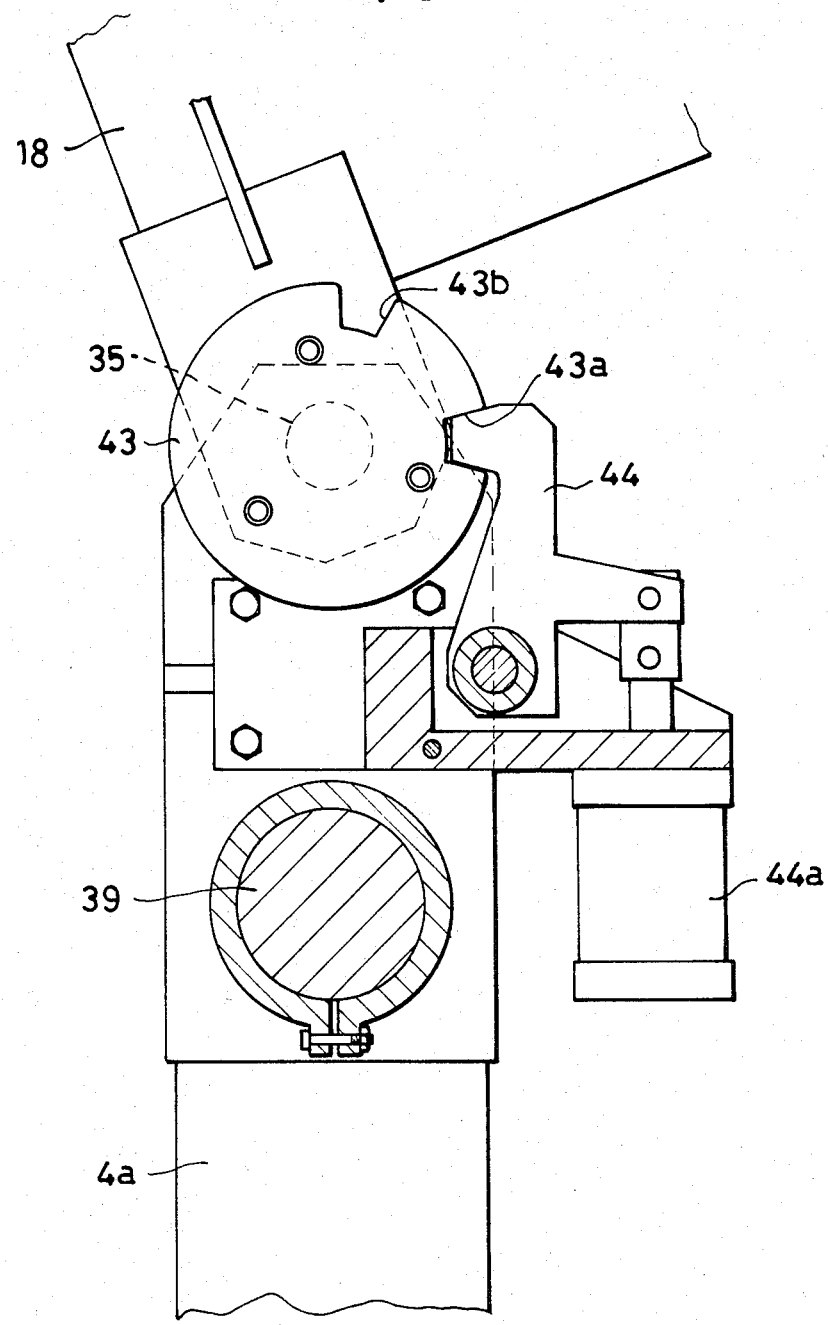
FIG. 11 is a sectional view taken along the line XI—XI in FIG. 10.

As shown clearly in FIG. 11, each swingable arm 18 is arranged to be locked at each of the set position B and the preset position C by cooperation of a swingable index 43 fixed thereto and a swingable lock 44 is provided on the machine frame 4a. The lock 44 can be engaged with and disengaged from the index 43. More in detail, the index 43 is provided with a pair of index grooves 43a, 43b corresponding to the respective positions B, C. Each swingable arm 18 may be locked at either of the positions B, C by the swingable lock 44 being inserted into engagement with either of the index grooves 43a, 43b by operation of a lock cylinder 44a connected to the swingable lock 44.

Next, the operation of the foregoing arrangement will be explained below with respect to the turning back motion of the preset jig means 6 from the set position B to the preset position C.

First, the swingable arm 18 on each side is unlocked and is swung to move from the set position B to the preset position C. Thereby, the turning about each supporting shaft 35 of each turnover lock 37 provided on each swingable arm serves to turn each supporting shaft 35 through each turnover index 36 engaged therewith. The turning of each supporting shaft 35 is inputted through each transmission mechanism 38 to the single common synchronous shaft 39, whereby the swing movement operations of the two swingable arms 18, 18 are synchronized one with the other. The two swingable arms 18, 18 can be swung to move to the preset position C synchronously one with the other, and are locked at the position.

Next, the engagement of each turnover lock 37 with each turnover index 36 is released. Each bracket 20 is turned over from the inwardly facing turnover position to the outwardly facing turnover position. In this case, each turnover index 36 is turned through each link 42 in conjunction with the turnover of each bracket 20. This turning is inputted through each supporting shaft 35 and each transmission mechanism 38 to the synchronous shaft 39. Consequently, the turnover operations of the two brackets 20, 20 are also synchronized one with the other.

For movement of the preset jig means 6 from the preset position C to the set position B, first each bracket 20 is turned over to its inwardly facing turnover position and then each swingable arm 18 is swung to move to the set position B. Also in this case, both the turnover movement operation and the swing movement operation are synchronized also in similar manner as described above.

In the illustrated example, from such a consideration that replacement of both the welding jig means 5 and the preset jig means 6 with new ones becomes necessary when a kind of motorcar body to be worked is changed to a different kind of one, the jig means 5, 6 are arranged to be detachably attached to the welding apparatus body 3 and the preset arrangement body 4, respectively. Thus, under the condition that the two jig means 5, 6 are combined together by the foregoing docking mechanism 24, the jig means 5 and 6 are detached from the respective bodies 3, 4, whereby the welding jig means 5 and the preset jig means 6 corresponding thereto can be handled as a single unitary set, so that a replacement thereof can be carried out at a high efficiency.

Figure 5:
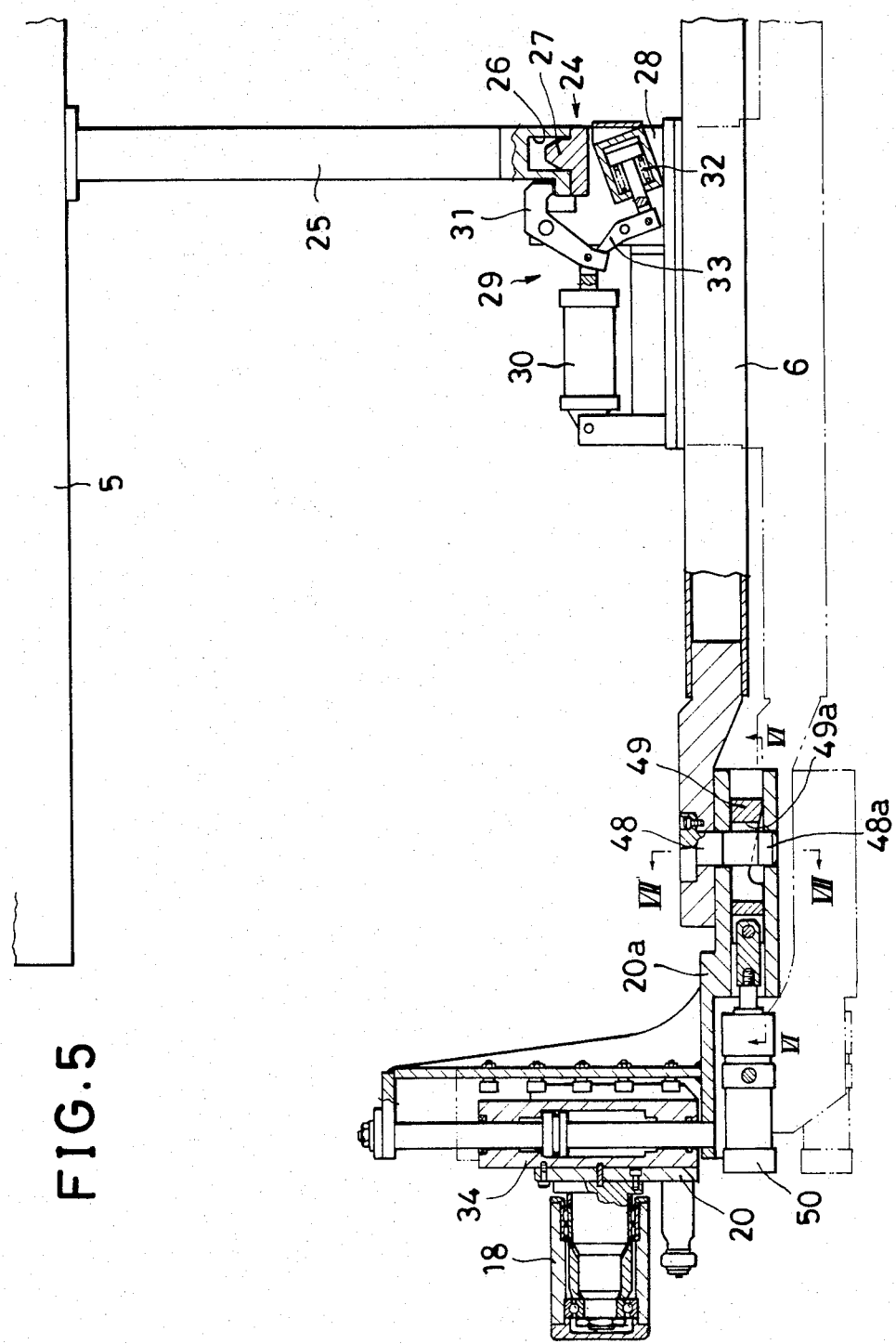
Figure 6:
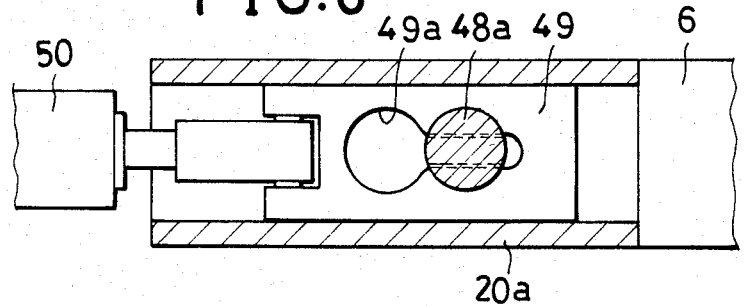
FIGS. 6 and 7 are sectional views taken along the lines VI—VI and VII—VII, respectively, in FIG. 5.
Figure 7:
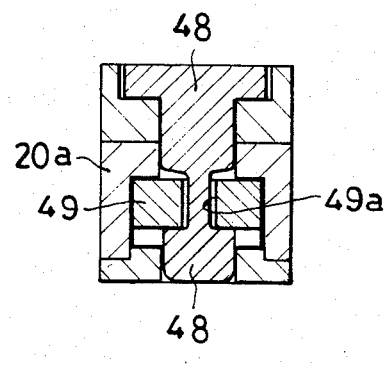

More in detail, the welding jig means 5 is arranged so that, as shown in FIG. 4, it is removably inserted, at its engaging rods 45 projecting therefrom, into the frame base 12 of the welding apparatus body 3, and is detachably fixed to the frame base 12 by wedge-shaped fixing members 46 on the frame base 12 by wedge-shaped fixing members 46 on the frame base 12 which are moved to advance and retreat to be brought into engagement with and disengagement from the forward end portion of the engaging rods 45 by respective engaging and disengaging cylinders 47. Additionally, the preset jig means 6 is arranged, as shown in FIGS. 5–7, so as to be removeably inserted, at each engaging pin 48 projecting at right angles therefrom and extending axially in the advancing and retreating directions of each receiving member 20a, into the receiving member 20a of the bracket 20, and is detachably fixed to the receiving member 20a by a fixing member 49 slideably provided in the receiving member 20a which is moved to advance and retreat by an engaging and disengaging cylinder 50. Further in detail, the fixing member 49 comprises a wedge-shaped member provided with a keyhole shaped opening 49a which is formed at its one end, as a large diametrical circular opening portion and is engageable with the pin 48 so that the engaging pin 48 is inserted through the opening 49a and may be fixed by tightening to the receiving member 20a, its enlarged head portion 48a projecting outwards from the opening 49a, owing to the wedging effect of the fixing member 49 caused by the retreating movement thereof.

Next, the working procedure in the case of replacement of the jig means will be explained as follows:

First, the welding jig means 5 and the preset jig means 6 are combined together by the docking mechanism 24 at the set position B, in the manner as mentioned above. The engaging pin 48 of the preset jig means 6 is moved down off from the opening 49a in such a manner that the fixing member 49 is released from engagement therewith and the receiving member 20a is retreated. Thus, the jig means 6 is separated from the preset arrangement body 4. In the above procedure, the engaging pin 48 extends axially in the advancing and retreating directions of the receiving member 20a so that the same can come off smoothly if the receiving portion 20a is retreated. Thus, the preset jig means 6 thus retreated is supported on the frame base 12 of the welding apparatus body 3 through the welding jig means 5. Next, the welding jig means 5 is released from its engagement with the fixing member 46. Thus, the two jig means 5, 6 in their docked condition are separated from the frame base 12 and are removed from the welding apparatus body 3 by a crane or the like not illustrated whereby a replacement thereof with others can then be carried out.

The foregoing explanation has been made in respect of the case that this invention is applied to the welding apparatus for a motorcar body, but it is a matter of course that this invention is not limited thereto.

Thus, according to this invention, there can be brought about various advantages as described below. Namely, this invention is such that plural component parts for constituting a workpiece are set on a welding jig means through a preset jig means, so that the working efficiency can be improved by the way that, while the component parts are being subjected to the welding operation by the welding jig means, new plural component parts for the next workpiece are set to the preset jig means. Additionally, in such a case that a workpiece comprises inner parts and outer parts, the workpiece is so set to the preset jig means that the inner parts thereof can be positioned inside, and in this case the inner parts may be preferably set in position by the engaging pin provided on the preset jig means.

It is readily apparent that the above-described workpiece preset jig arrangement in a welding apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A workpiece preset jig arrangement in a welding apparatus having a welding apparatus body, welding jig means on said welding apparatus body, and clamp means on said welding jig means for clamping plural component parts for constituting a workpiece to be welded to another workpiece, and means on said welding jig means for welding said constituted workpiece to said other workpiece, said arrangement comprising:

preset arrangement body means positioned adjacent said welding apparatus body for movement relative thereto, preset jig means provided on said preset arrangement body means for presetting of said plural component parts, and preset clamp means on said preset jig means for clamping said plural component parts, said preset jig means being movable between a set position facing said welding jig means and a preset position away from said set position and said welding jig means, said set position being such that said plural component parts constituting said workpiece may be transferred from said preset jig means to said welding jig means by releasing said preset clamp means on said preset jig means and engaging said clamp means on said welding jig means.

2. A workpiece preset jig arrangement according to claim 1, further comprising a docking mechanism for mutually positioning and combining said welding jig means and said preset jig means at said set position.

3. A workpiece preset jig arrangement according to claim 2, further comprising means for detachably connecting said welding jig means and said preset jig means to said welding apparatus body and said preset arrangement body means, respectively, whereby said welding jig means and said preset jig means may be disconnected from said respective welding apparatus body and preset arrangement body means while said welding jig means and said preset jig means are combined together by said docking mechanism.

4. A workpiece preset jig arrangement according to claim 3 wherein said preset arrangement body means is provided with a pair of swingable arms each being so supported through a supporting shaft on a machine frame of said preset arrangement body means as to be swingable between said set position and said preset position, and the preset jig means is connected to said pair of swingable arms through a pair of brackets each supported turnably for movement in either direction between said positions on one of said swingable arms whereby said preset jig means may be moved between said set position and said preset position while being turned over between an inwardly facing posture and an outwardly facing posture by swinging movements of the respective swingable arms and turnover movements of the respective brackets.

5. A workpiece preset jig arrangement according to claim 4, wherein each said supporting shaft for each said swingable arm is turnable about both the swingable arm and the machine frame of said preset arrangement body means, and a turnover index arranged to be turned in conjunction with the turnover movements of each said bracket is fixedly provided on each said supporting shaft, and each of the turnover indexes is provided with a turnover lock which can be engaged with and disengaged from its corresponding turnover index, and the machine frame is provided with a single common synchronous shaft connected to each said supporting shaft through a power transmission mechanism associated with each said supporting shaft.

6. A workpiece preset jig arrangement according to claim 4, wherein a receiving member is provided on each said bracket for attaching the preset jig means thereto, and each said receiving member is arranged to be movable to advance and retreat along the direction of said swinging movements of each said swingable arm.

7. A workpiece preset jig arrangement according to claim 6, wherein said preset jig means is detachably engageable with each said receiving member through an engaging pin which extends axially in the direction of advancing and retreating movements of the receiving member.

8. A workpiece preset jig arrangement according to claim 2, wherein said preset arrangement body means is provided with a pair of swingable arms each being so supported through a supporting shaft on a machine frame of said preset arrangement body means as to be swingable between said set position and said preset position, and said preset jig means is connected to said pair of swingable arms through a pair of brackets each supported turnably for movement in either direction between said positions on one of said swingable arms whereby said preset jig means may be moved between said set position and said preset position while being turned over between an inwardly facing posture and an outwardly facing posture by swinging movements of the respective swingable arms and turnover movements of the respective brackets.

9. A workpiece preset jig arrangement according to claim 8, wherein each said supporting shaft for each said swingable arm is turnable about both the swingable arm and the machine frame of said preset arrangement body means, and a turn-over index arranged to be turned in conjunction with the turnover movements of each said bracket is fixedly provided on each said supporting shaft, and each of said turnover indexes is provided with a turnover lock which can be engaged with and disengaged from its corresponding turnover index, and said machine frame is provided with a single common synchronous shaft connected to each said supporting shaft through a power transmission mechanism associated with each said supporting shaft.

10. A workpiece preset jig arrangement according to claim 8, wherein a receiving member is provided on each said bracket for attaching the preset jig means thereto, and each said receiving member is arranged to be movable to advance and retreat along the direction of said swinging movements of each said swingable arm.

11. A workpiece preset jig arrangement according to claim 10, wherein said preset jig means is detachably engageable with each said receiving member through an engaging pin which extends axially in the direction of advancing and retreating movements of the receiving member.

12. A workpiece preset jig arrangement according to claim 1, wherein said preset arrangement body means is provided with a pair of swingable arms each being so supported through a supporting shaft on a machine frame of said preset arrangement body means as to be swingable between said set position and said preset position, and said preset jig means is connected to said pair of swingable arms through a pair of brackets each supported turnably for movement in either direction between said positions on one of said swingable arms whereby said preset jig means may be moved between said set position and said preset position while being turned over between an inwardly facing posture and an outwardly facing posture by swinging movements of the respective swingable arms and turnover movements of the respective brackets.

13. A workpiece preset jig arrangement according to claim 4, wherein each said supporting shaft for each said swingable arm is turnable about both the swingable arm and the machine frame of said preset arrangement body means, and a turn-over index arranged to be turned in conjunction with the turnover movements of each said bracket is fixedly provided with a turnover lock which can be engaged with and disengaged from its corresponding turnover index, and the machine frame is provided with a single common synchronous shaft connected to each said supporting shaft through a power transmission mechanism associated with each said supporting shaft.

14. A workpiece preset jig arrangement according to claim 12, wherein a receiving member is provided on each said bracket for attaching the preset jig means thereto, and each said receiving member is arranged to be movable to advance and retreat along the direction of said swinging movements of each said swingable arm.

15. A workpiece preset jig arrangement according to claim 14, wherein said preset jig means is detachably engageable with each said receiving member through an engaging pin which extends axially in the direction of advancing and retreating movements of the receiving member.

* * * * *

UNITED STATES PATENT AND TRADEMARK OFFICE
CERTIFICATE OF CORRECTION

PATENT NO. : 4,535,927
DATED     : August 20, 1985
INVENTOR(S) : SOICHI MATSUBARA ET AL It is certified that error appears in the above-identified patent and that said Letters Patent is hereby corrected as shown below:

On the cover page, Item [30], change "57-93423[U]" to --- 57-83423[U] ---.

Signed and Sealed this

Third Day of June 1986

[SEAL]

Attest:

DONALD J. QUIGG

Attesting Officer

Commissioner of Patents and Trademarks